United States Patent [19]

Chin-Hua

[11] Patent Number: 4,929,258
[45] Date of Patent: May 29, 1990

[54] METHOD USED TO PURIFY SMOKE POLLUTANT

[76] Inventor: Wang Chin-Hua, No. 12, Ning An St., Sung Shan, Taipei, Taiwan

[21] Appl. No.: 307,610

[22] Filed: Feb. 7, 1989

[51] Int. Cl.⁵ .......................................... B01D 47/12
[52] U.S. Cl. ........................................ 55/86; 55/92; 55/94; 55/228; 55/230; 55/259
[58] Field of Search ................ 55/86, 90, 92, 94, 223, 55/228, 230, 242, 259, DIG. 30

[56] References Cited

U.S. PATENT DOCUMENTS

| | | | |
|---|---|---|---|
| 3,448,562 | 6/1969 | Wisting | 55/94 X |
| 4,170,458 | 10/1979 | Hartwick | 55/90 X |
| 4,305,909 | 12/1981 | Willett et al. | 55/94 X |
| 4,308,037 | 12/1981 | Meissner et al. | 55/86 X |
| 4,609,386 | 9/1986 | Sibley et al. | 55/223 |
| 4,620,858 | 11/1986 | Bradshaw et al. | 55/94 X |
| 4,668,254 | 5/1987 | Womsley | 55/DIG. 30 X |

*Primary Examiner*—Charles Hart
*Attorney, Agent, or Firm*—Ladas & Parry

[57] ABSTRACT

The invention is associated with a method used to purify smoke pollutant. The smoke pollutant can be introduced to several hollow tanks filled with plenty of water droplets. The smoke pollutant can contact with water droplets to condense inside tanks. So the smoke pollutant can be purified completely without smoke and odor by this kind of treatment.

12 Claims, 6 Drawing Sheets

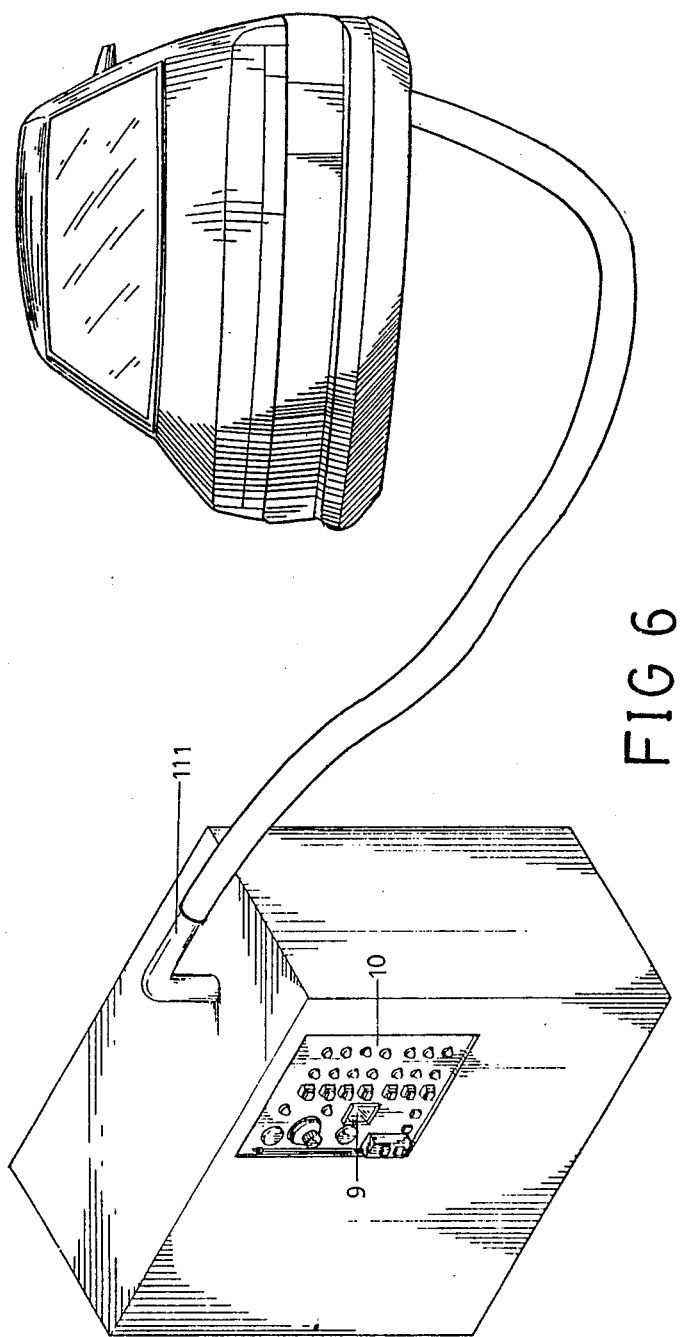

METHOD USED TO PURIFY SMOKE POLLUTANT

BACKGROUND OF THE INVENTION

Due to the industrialization of agricultural society, many factories are formed and a lot of stacks are constructed. It is especially true that the amount of vehicles and motorcycles greatly increased in limited area. So the air pollution has become a big threat to people's living environment. From the assessment and test reports of many specialists, it shows there is a layer of ozone formed in the sky due to serious air pollution. The cool air can not flow in from outer space and the hot air can not flow out. It will destroy natural balance of environment. If the situation is getting worse, the creature's life will be threatened.

SUMMARY OF THE INVENTION

It is associated with a method used to purify smoke pollutant. The smoke pollutant can be introduced to several connected closed hollow tanks. The water level is suitable high in the hollow tanks. There is a rotating shaft with many blades which can be used to splash water to fill all over the hollow tanks. The smoke pollutant can contact with water droplets to condense inside tanks. The treatment is no smoke, no odor to maintain clean air and eliminate environmental pollution problem. It features a highly commercial application benefit.

BRIEF DESCRIPTION OF THE DRAWING

FIG. 6 shows the application of the invention experimentted on a car.

DESCRIPTION OF THE INVENTION

Figure 1:
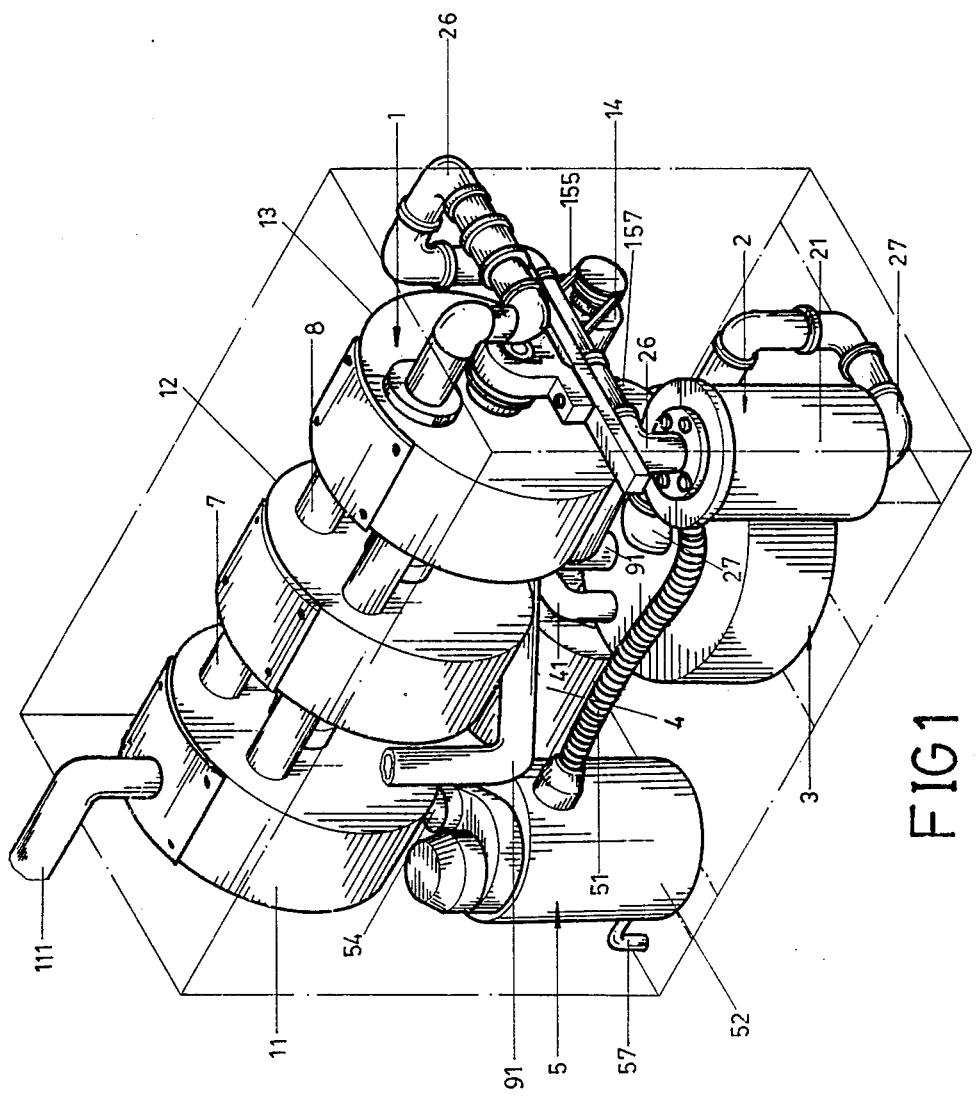
FIG. 1 shows the front view of installation, structure and assembly of the invention.
Figure 2:
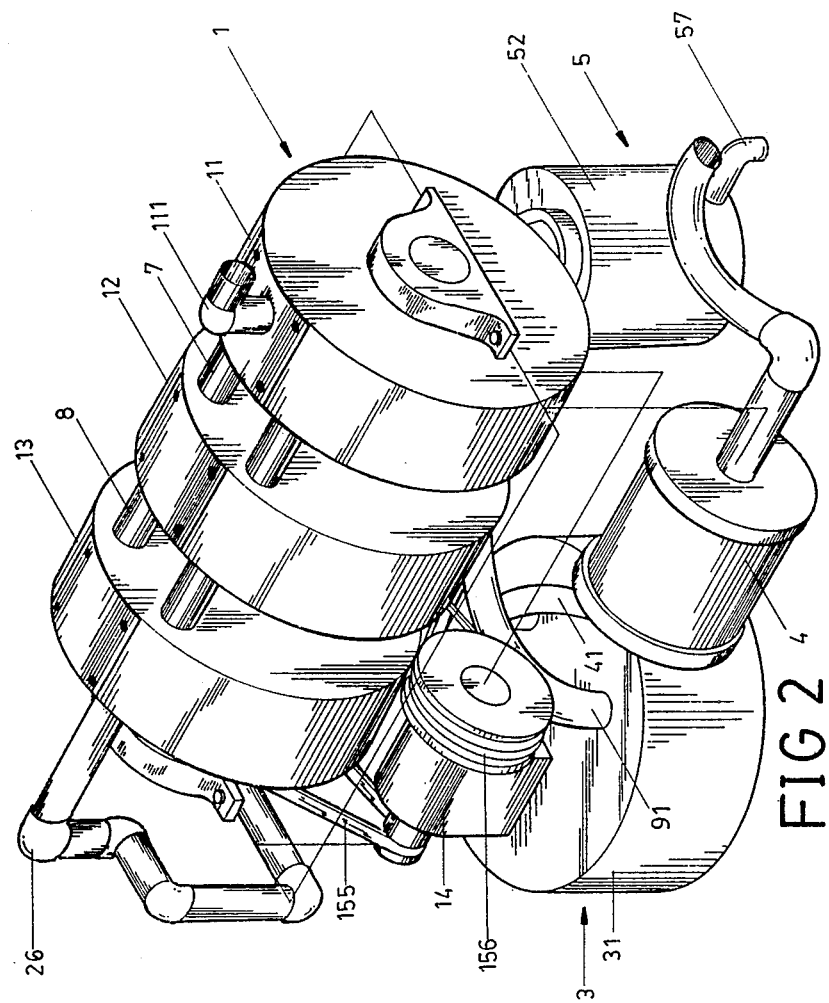
FIG. 2 shows the rear view of installation, structure and assembly of the invention.
Figure 3:
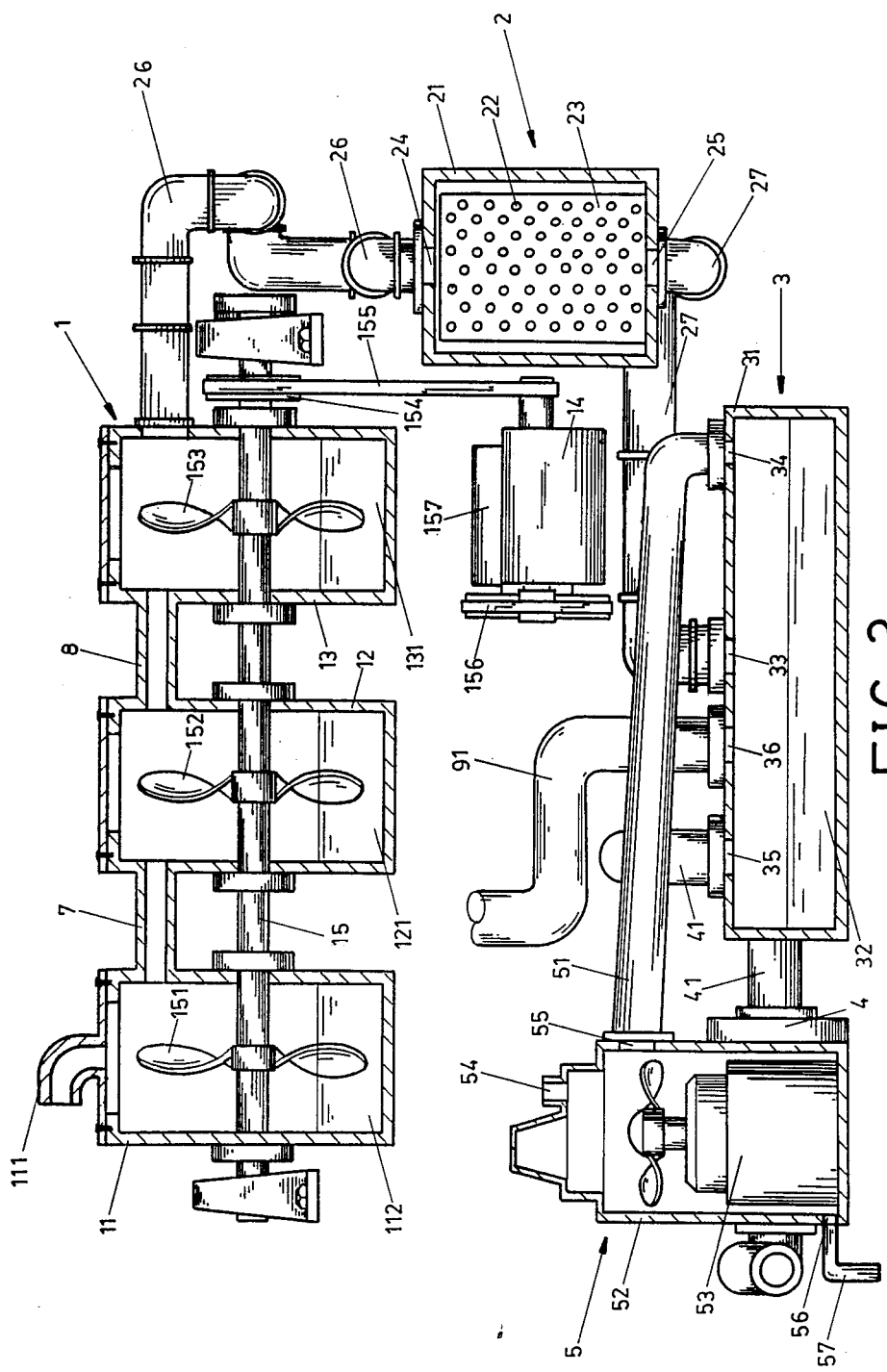
FIG. 3 shows the cross section view of installation, structure and assembly of the invention.
Figure 4:
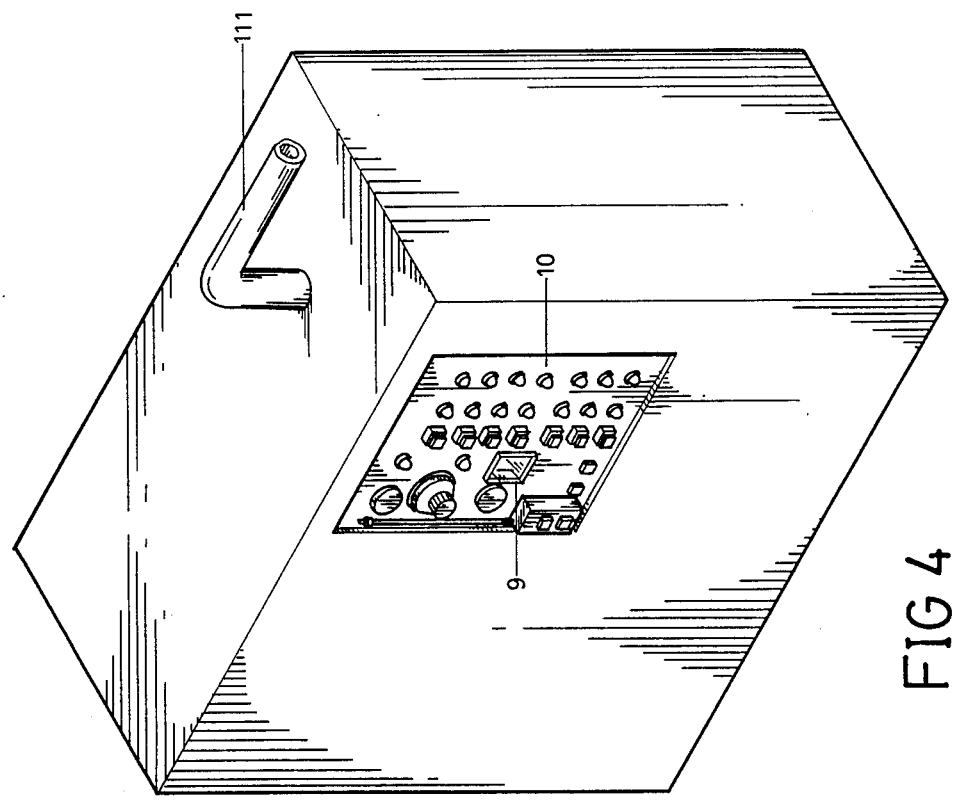
FIG. 4 shows the assembled appearance of the invention.
Figure 5:
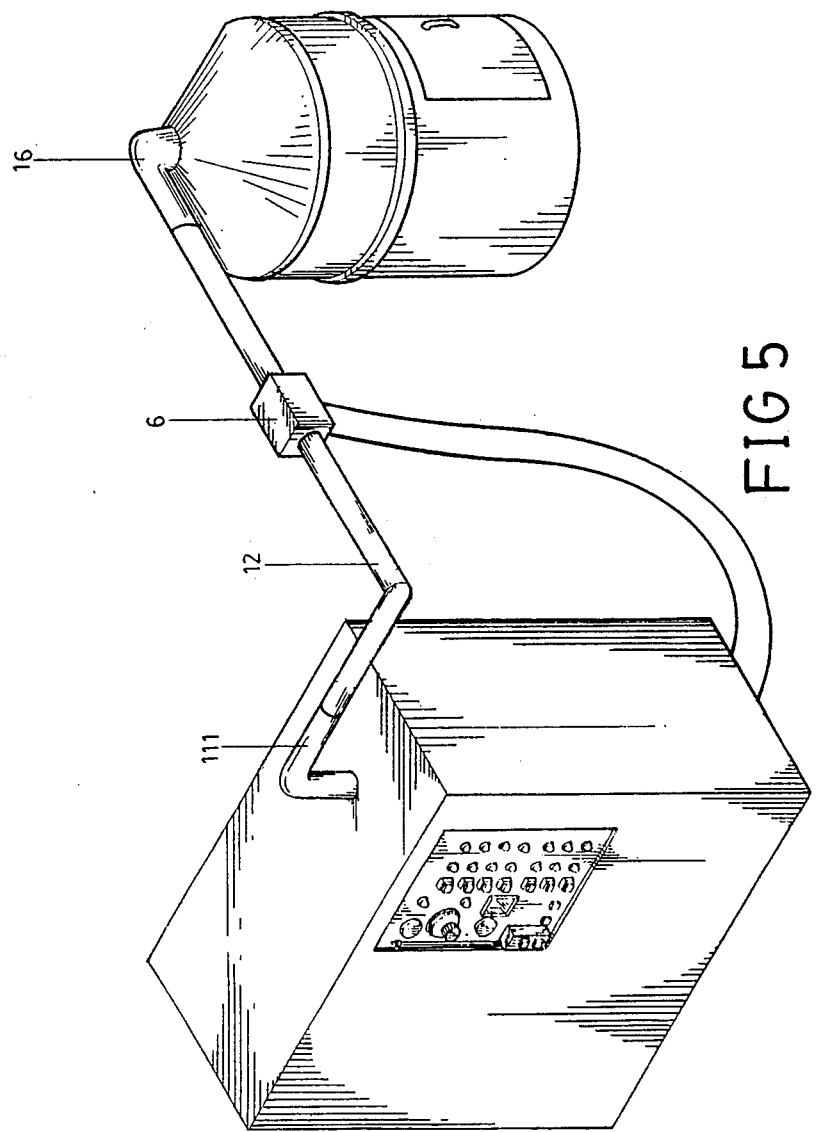
FIG. 5 shows the application of the invention experimented in a factory.

Please refer to FIG. 1 through FIG. 3. The invention consists of power treatment tank (1), a filter tank (2), a sludge collecting tank (3) and an oil recovery tank (5). Their related position and structure are: power treatment tank (1) is composed of several connected hollow tanks (11) (12) (13) (it means there are pipes (7) (8) among three hollow tanks (11) (12) (13)) with a motor (14). At suitable top part of hollow tank (11), there is an inlet tube (111), the smoke pollutant can flow into hollow tank (11) through the inlet tube (111). Then it is diffused into the other two hollow tanks (12) (13). At the bottom of hollow tanks (11) (12) (13), there is a suitable height of water levels (112) (121) (131). At suitable central part of hollow tanks (11) (12) (13), there is a shaft (15) with rotating blades (151) (152) (153). Part of rotating blades (151) (152) (153) is submerged (112) (121) (131) so that water can be splashed all over hollow tanks (11) (12) (13) when the rotating blades (151) (152) (153) is in operation. There is a belt wheel (154) at the tail of shaft (15) which is connected to the shaft of motor (14) by belts (155) (156) and speed reducer (157) to form a transmission system. When motor (14) is in operation, the shaft (15) is rotating so that water is splashed by rotating blades (151) (152) (153). The filter tank (2) is composed of a hollow tank (21) and another hollow tank (23) with many perforated holes (22). There are passing holes (24) (25) at the top and bottom of hollow tank (21). There are two ventilation hoses (26) (27) which penetrate into hollow tank (13) and sludge collecting tank (3) through these two passing holes (24) (25). The sludge collecting tank is constructed by a hollow tank (31) with suitable height of water level (32) to collect the residue of filtered smoke pollutant. There are several passing holes (33) (34) (35) (36) at the top of it which are used to connect with filter tank (2), oil recovery tank (5), pressure balance tank (4) and the ventilation hoses (27) (51) (41) (91) and glass window (9) to watch the concentration of smoke pollutant from machine panel, so that the residual smoke can be induced into it. The oil recovery tank (5) (this component is used to recover oil, thus, it is necessary to be installed on car and motorcycle, the invention is used to treat smoke pollution of factory it is not necessary to be installed to reduce cost) is composed of a hollow tank (52) with oil pumping motor blade (53). There is a glass window (54) at the top of it to be used to watch the amount of recovered oil. There are two passing holes (55) (56) at both sides of it to be used to connect with air hose (51) and oil discharge here (57). When motor blade 53) is in operation, the oil stored in sludge collecting tank (3) can be pumped into oil recovery tank (5). If the recovered oil is full in recovery tank (5) which can be discharged through outlet hose (57) for reuse. Please refer to FIG. 4 through FIG. 6 for the operation of the invention. FIG. 4 shows the assembled appearance of the invention. There is a front panel (10) with power switch which can be used to control inside motors (14) (6). FIG. 5 shows the application of the invention on the stack (16) of a factory. It is connected by a ventilation hose (12) to the stack (16) and passing hose (111) and a smoke pumping motor (6) is instslled to accelerate the operation speed. When it is operated, smoke pumping motor (6) will introduce the smoke pollutant from the stack (16) to hollow tank (11) through ventilation hose (12) and passing hose (111). Now turn on the power switch, the motor (14) operates to revolve rotating blades (151) (152) (153) for splashing water levels (112) (121) (131) to form water drops all over hollow tanks (11) (12) (13). Most of smoke pollutant then condenses with water to form water drops (because the content of smoke pollutant is water) inside hollow tank (11). The residual smoke pollutant is passed to the second hollow tank (12) through passing hose (7) to perform the second contact filtration and condensation. There is only a little smoke pollutant left (or it may be removed completely). The residual smoke pollutant is diffused to the third hollow tank (13) for another contact filtration and condensation. If there is any other waste gas (no residue for most cases left, it is introduced into filter tank (2) through ventilation hose (26) so that the sludge inside of residual waste gas can adhere on the holes (22) of hollow tank 23) in filter tank (2). Then the waste gas is introduced to sludge collecting tank (3) through ventilation hose (27) for final precipitation and filtration, so that if fluent gas is clean without smoke and odor. The pressure balance tank (4) at the tail of ventilation hose (41) is used to regulate pressure balance so that the force caused by the blow of smoke pollutant can be balanced. If the invention is used on car and motorcycle, the operation procedures are the same as above description (see FIG. 6). It is installed on the gas discharger of car and motorcycle. The difference is that when waste gas passes to sludge collecting tank (3), the gasoline can not be removed with water drops, and it is floated on water in sludge collecting tank (3). it has to be treated by oil recovery tank (5) to pump gasoline to oil recovery tank (5), then it is discharged from discharge oil hose (57) for reuse. So, the invention is suitable for the treatment of smoke pollutant for factories or cars and motorcycles. Besides, the gate valves can be equipped on the hollow tanks (2) (11) (12) (13) (3) (5) in the invention, so that the sludge inside the hollow tanks (2) (11) (12) (13 (3) (5) can be discharged for further treatment, then recovered as chemical fertilizer. From the above description, it shows that the major object of the invention is to provide an installation used to purify smoke pollutant. It can be used in a factory to replace stack without discharging smoke pollutant out the factory. The other object of the invention is to provide an installation used to purify smoke pollutant. It can be used on car and motorcycle so that they will not discharge smoke pollutant thus the cleanness of air can be maintained. The other object of the invention is that it can be used on smoke and oil discharger in the kitchen so that the smoke pollutant can be removed from the effluent gas. The other object of the invention is that besides the function of removal of smoke pollutant, it can be used to recover oil and chemical fertilizer for reuse with highly economical performance. It is summarized that this invention has above said excellent performances which can be used in various industries. It is also unique and new, so it is truly a new innovation.

What is claimed is:

1. A method of separating smoke pollutants from air, said method comprising:
   providing a plurality of hollow tanks;
   aero-communicatively connecting said hollow tanks in series;
   partially filling each said hollow tanks with water, each said hollow tank substantially enclosing water, preventing circulation of the enclosed water to a location external to said hollow tank;
   agitating the water in said hollow tanks to form droplets;
   introducing the smoke-polluted air to a first of said hollow tank in series, the smoke pollutants being mixed and condensed with the droplets so as to purify the air before passing the air to the next hollow tank in series;
   passing the purified air to a filter tank; and
   filtering the purified air in said filter tank to further remove smoke pollutants from the air.

2. A method as claimed in claim 1 further comprising:
   passing the air to a sludge collecting tank; and
   precipitating and filtering the air in said sludge collecting tank.

3. A method as claimed in claim 2 further comprising:
   passing said precipitated and filtered air to an oil recovery tank; and
   recovering oil from the air.

4. A method as claimed in claim 1 further comprising a pressure balancing step where the flow of the smoke polluted air can be regulated.

5. An apparatus to remove smoke pollutants from air, said apparatus comprising:
   a plurality of hollow tanks for partial containment of water, said hollow tanks substantially enclosing said water preventing circulation of said water external to each said hollow tank;
   means for agitating said water to form droplets;
   a filter tank;
   a second means for connecting a last of said hollow tanks in series to said filter tank;
   means to introduce the smoke polluted air to a first of said hollow tanks in series so that when said agitation takes place, the smoke pollutants are mixed with and condensed with the droplets so as to purify the air, said air is further purified as it is passed from one hollow tank to the next hollow tank in series, said air further purified when it is passed to said filter tank.

6. An apparatus as claimed in claim 5 further comprising:
   a sludge collecting tank for precipitating and filtrating the air from said filter tank; and
   a third means for communicatively connecting said filter tank to said sludge collecting tank.

7. An apparatus as claimed in claim 5 wherein said agitating means comprises rotating blades located in each said hollow tank, said rotating blades partially immersed in the water, said blades mounted on a common shaft, said shaft driven by a motor.

8. An apparatus as claimed in claim 6 further comprising means for recovering oil.

9. An apparatus as claimed in claim 8 wherein said oil recovering means comprises an oil recovery tank, a fourth means for communicatively connecting said sludge collecting tank to said oil recovery tank, and an oil pumping motor blade to draw the air into said oil recovery tank.

10. An apparatus as claimed in claim 9 further comprising a pressure balance tank attached to the sludge collecting tank to regulate the pressure of the flow of smoke polluted air.

11. An apparatus as claimed in claim 10 further comprising means to adapt said apparatus with a gas discharger of a car.

12. An apparatus as claimed in claim 10 further comprising means to adapt said apparatus with a gas discharger of a motorcycle.

* * * * *